May 10, 1966  D. L. HILDEBRAND  3,250,407
BIN TYPE UNLOADER ASSEMBLY
Filed June 19, 1964  3 Sheets-Sheet 2
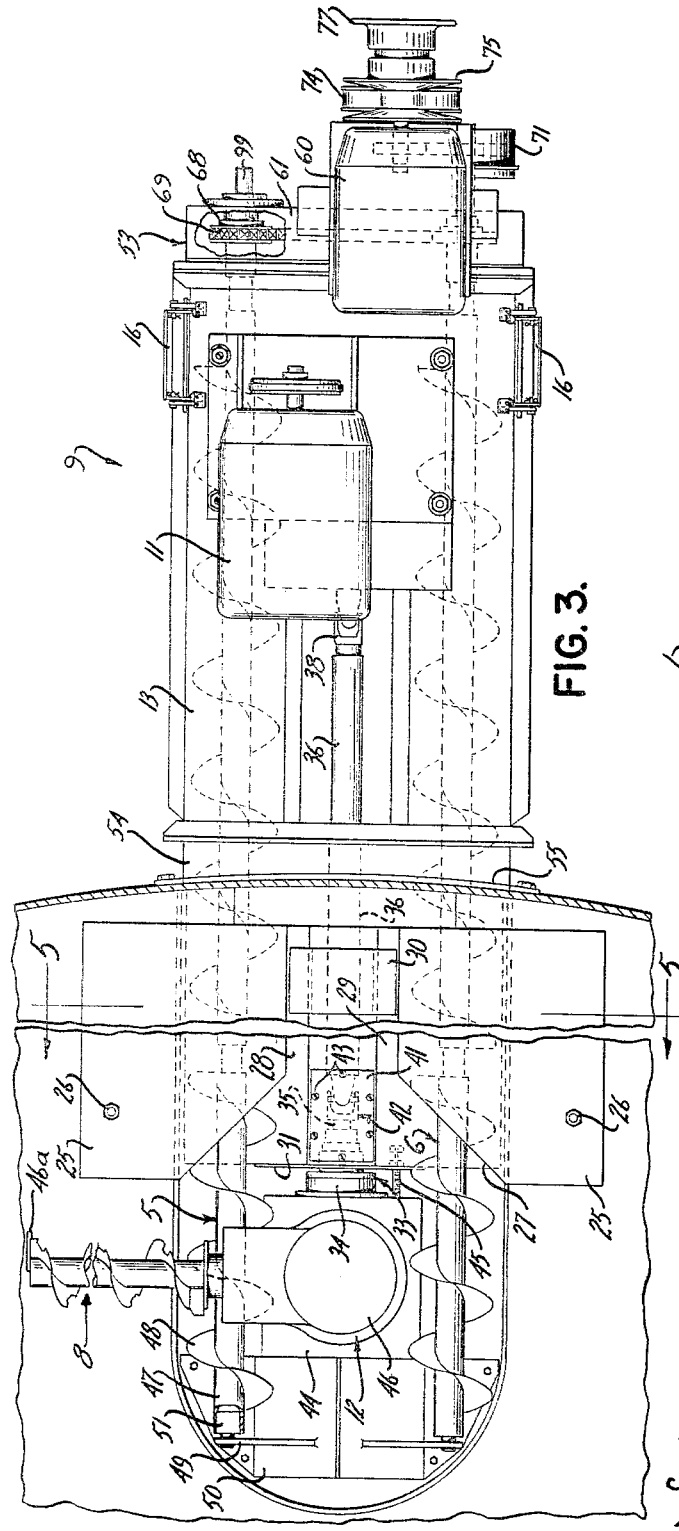
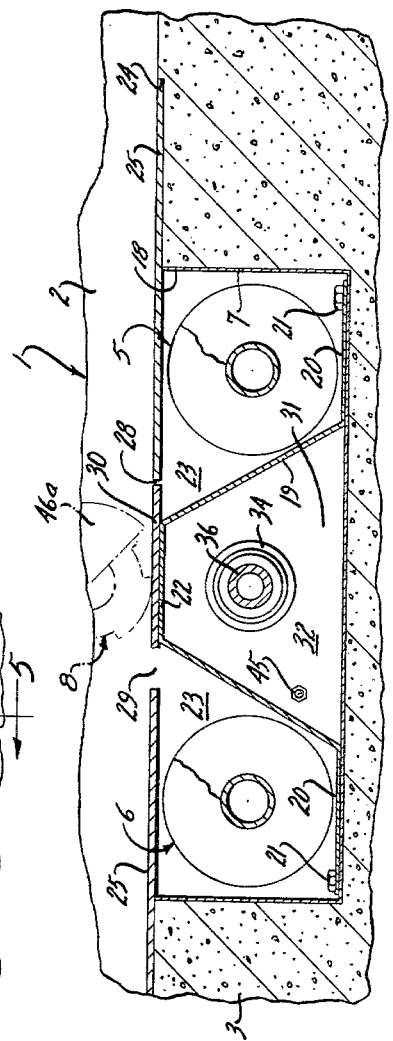
INVENTOR.
DONALD L. HILDEBRAND
BY
Andrus & Starke
Attorneys May 10, 1966  D. L. HILDEBRAND  3,250,407
BIN TYPE UNLOADER ASSEMBLY
Filed June 19, 1964  3 Sheets-Sheet 3
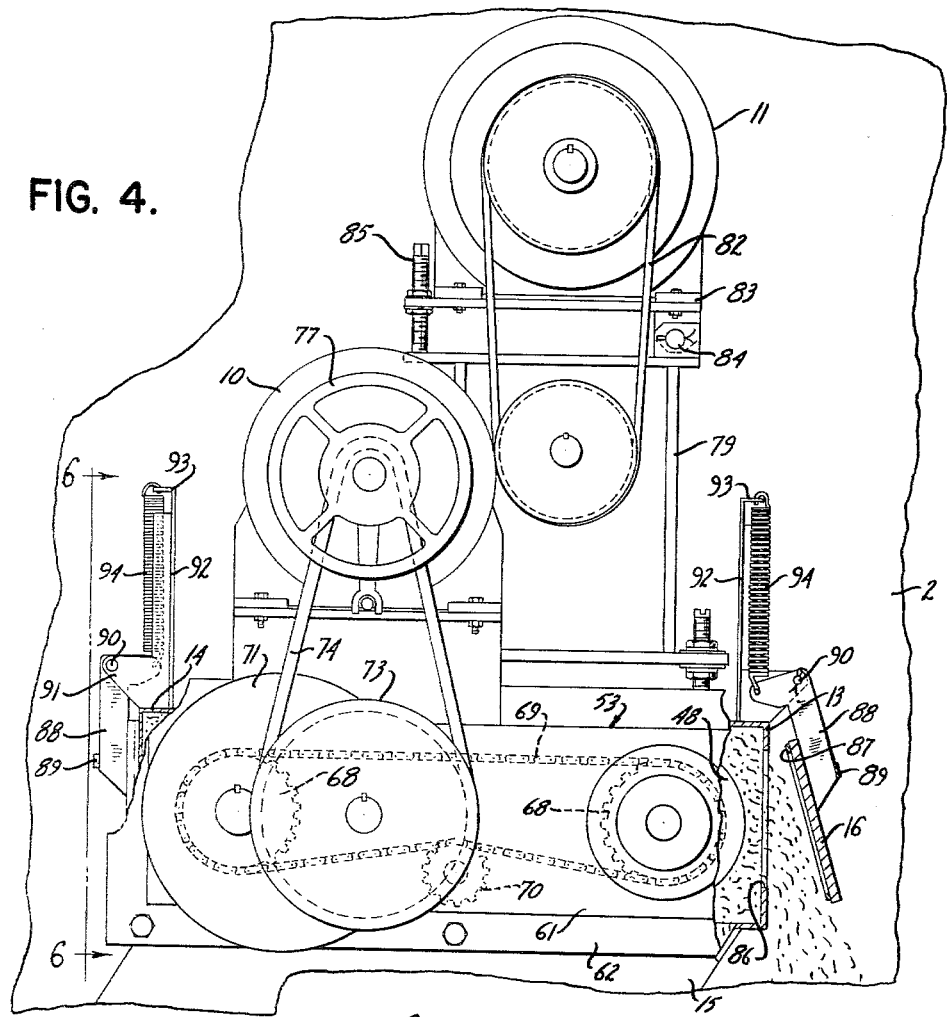
FIG. 4.
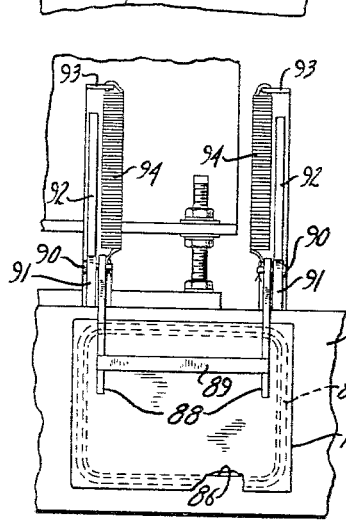
FIG. 6.
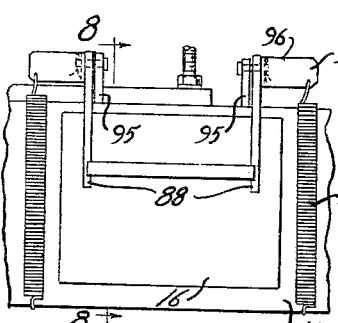
FIG. 7.
FIG. 8.
INVENTOR.
DONALD L. HILDEBRAND
BY
Andrus & Starke
Attorneys though the drawings and specification describe the preferred

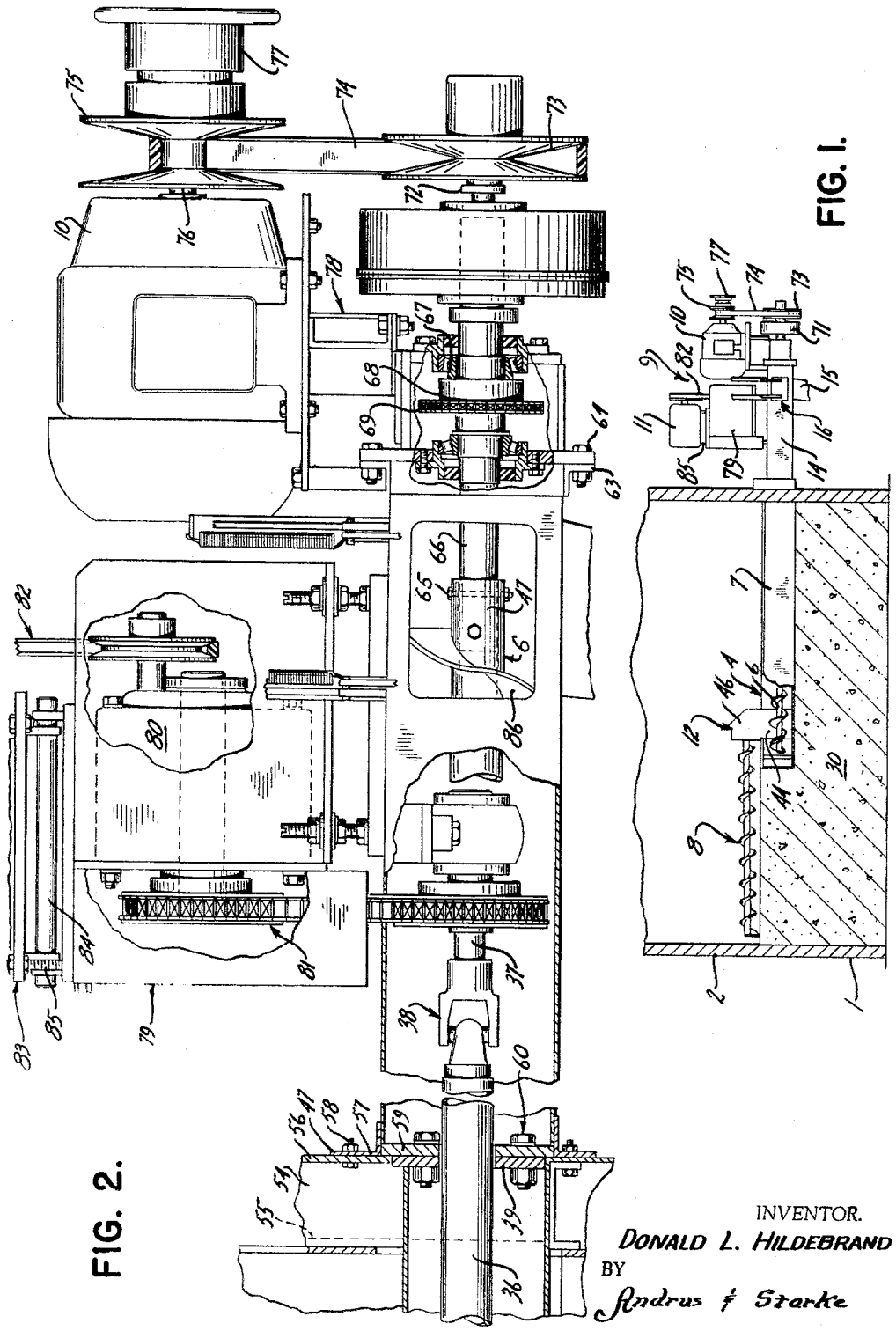

United States Patent Office 3,250,407
Patented May 10, 1966

3,250,407
BIN TYPE UNLOADER ASSEMBLY
Donald L. Hildebrand, Bloomingdale, Ill., assignor to A. O. Smith Harvestore Products, Inc., Arlington Heights, Ill., a corporation of Delaware
Filed June 19, 1964, Ser. No. 376,509
14 Claims. (Cl. 214—17)

This invention relates to a bin unloader, and particularly to a bottom unloader for removing grain and similar free or semi-free flowing materials from the bottom of a storage structure at a high rate of discharge.

Grain and other materials are often stored in vertically extended, cylindrical type bins with the material being unloaded from the top or bottom surface. The present invention is particularly directed to unloaders for removing the material from the low point or bottom of the storage structure. A highly desirable unloading structure is disclosed in the applicant's copending application entitled Sweep Arm Transmission for Storage Structures which was filed on November 29, 1963 with Serial No. 326,665 and of which the present application constitutes a continuation-in-part. The discharge assembly disclosed and illustrated in the previous application particularly includes a pair of stacked discharge augers mounted centrally of the structure and extending radially therefrom. The upper auger is mounted to sweep across the floor of the storage bin to positively move the material into a central opening and thereby into the lower discharge auger channel or trough for transfer from the unit.

The above application is particularly directed to an improved and unique coupling mechanism which creates a controlled sweep action of the sweep auger. This is desirable in order to eliminate the wedging action of certain materials.

The present invention is particularly directed to an unloader structure having a sweep auger and a discharge auger which are driven independently of each other by power means located exteriorly to the bin proper. The system permits matching of auger speeds to the nature of the material being handled. The present invention is further directed to an improved arrangement and structure for assembling the respective augers and the drive connections. An important and special feature forming an aspect of the present invention is a pair of relief doors which are resiliently mounted in the discharge channel exteriorly of the bin. If, for any reason, the discharge opening or passage is clogged and prevents the material from being discharged in the normal manner, the resiliently loaded relief doors provide a safety discharge from the unit. The system will thereby prevent establishment of damaging stresses within the discharge auger system which would shear the auger flights or the like.

In accordance with the preferred construction of the present invention, the sweep auger is mounted to sweep across the bottom floor structure. A central opening is provided to receive the material gathered by the sweep auger with a pair of dual discharge augers mounted within a recessed trough immediately below the floor level. The augers are preferably mounted to opposite sides of the main transmission with a central dividing wall unit defining a pair of discharge channels, one for each of the augers. The central dividing wall unit further provides a protective cover over a sweep auger-drive shaft connection which extends outwardly from the transmission unit to the exterior portion of the silo or bin where it is connected to a separate drive source.

Additionally, in accordance with the present invention, cover or floor plates are secured to the opposite sides of the discharge trough and extend towards each other over the trough, terminating in spaced relation to provide a radial opening into the discharge trough. A small traversing plate completely spans the opening between the floor plates to support the sweep auger as it moves over the trough.

Exteriorly of the bin, a box-like structure is secured to the bin and includes a pair of separate tubular channel members interconnected to each other in laterally spaced relation to receive the outer ends of the discharge augers and constitute extensions of the discharge troughs or channels. The outer ends of the tubes are interconnected to a discharge member and to an interconnecting drive mechanism such that a single power source is employed to simultaneously drive the discharge augers. Relief doors are resiliently mounted one each within the outer walls of the discharge tubes immediately adjacent to the discharge opening ends. If, for any reason, during the operation of the assembly, the discharge openings should become clogged to prevent the normal discharge of material, the relief doors open at a selected pressure established by the packing of the material by rotating discharge augers and permit the compacted material to readily discharge from the discharge tubes. The spring or resilient loading of the doors, however, will maintain an essentially air-tight seal of the passageway under all normal operations.

The present invention thus provides an unloading mechanism for circular bins and the like which can be adapted for either free flowing or semi-free flowing material. The separate and independent drives allow ready matching of the auger speeds to the nature of the material being handled, and further permits a sweep auger with adequate power to operate under a large mass of material within the bin. The twin discharge auger and the assembly for feeding to the discharge auger permits high speed unloading of the structure. The special relief doors of the present invention positively prevent damaging of the discharge auger structures because of jamming of the discharge opening.

The drawings furnished herewith illustrate a preferred structure for carrying out the present invention.

In the drawings:

FIG. 1 is a partial vertical section of a storage bin showing the general arrangement of the present invention;

FIG. 2 is an enlarged side elevational view of the exterior drive components as shown in FIG. 1 with parts broken away to show certain structural details;

FIG. 3 is a top elevational view of the unloader structure shown in FIGS. 1 and 2;

FIG. 4 is an enlarged end view of the exterior drive mounting or power connections shown in FIGS. 1 and 2 and generally taken from the right side of FIG. 2;

FIG. 5 is a vertical section taken on line 5—5 of FIG. 3 showing construction of the discharge auger channels within the storage bin structure;

FIG. 6 is a side elevational view of a relief door shown in the prior figures;

FIG. 7 is a fragmentary side elevational view similar to FIG. 6 illustrating an alternative construction of the relief door; and FIG. 8 is a side view of FIG. 7.

Referring to the drawings and particularly to FIGS. 1–3, a fragmentary lower portion of a cylindrical structure or bin 1 is illustrated which may be used to store materials, not shown, such as grain, silage, industrial products or other free or semi-free flowing material. Generally, the structure 1 includes an upstanding vertical circular wall 2 which is formed of wood, glass lined metal or any other suitable material and which is mounted upon a concrete base 3. An auger unloading unit 4 is mounted within the bottom portion of the bin 1 for transferring of the stored material therefrom. Generally, the unloader unit 4 includes a pair of radially extending and laterally spaced discharge augers 5 and 6 mounted within a discharge trough 7 formed in the top surface of base 3 and extended from a center opening outwardly of base 3. A sweep auger 8 is also mounted within the bin 1 and essentially extends from the center of the channel trough 7 outwardly over the top of base 3 to the adjacent outer wall 2. Sweep auger 8 is rotatably mounted at the center of bin 1 for sweeping or indexing over the top of base 3 for continuously and positively moving of the stored material into the bin center and the discharge trough 7. The discharge augers 5 and 6 and the sweep auger 8 are connected to be driven through an external mounted discharge and drive assembly 9 including a separate discharge auger motor 10 and a sweep auger motor 11. The use of separate motors 10 and 11 and the connections to the augers 5, 6 and 8 is a very important aspect of the present invention in permitting the separate selective control of the speeds and the torques of the respective systems such that auger speeds can be closely matched to the material being handled and particularly such that the sweep auger 8 can be operated with sufficient power with a large mass within the bin 1.

As in the previously referred to copending application, the inner end of the sweep auger 8 is connected to a transmission 12 which is mounted in the inner or central end of the trough 7 between the innermost end of the augers 5 and 6. Transmission 12 is coupled to the sweep auger motor 11 as subsequently described to index the sweep auger 8 across the floor area and to simultaneously rotate the auger about its own axis to transfer material into the center of the trough 7. The discharge augers 5 and 6 extend through trough 7 and from the bin 1 through a pair of correspondingly positioned tubular trough extension housing or tubes 13 and 14. Augers 5 and 6 are coupled to motor 10 for simultaneous operation for moving the material from the trough 7 to a discharge funnel or spout 15 connected to the underside of housings 13 and 14.

In accordance with the present invention, similar relief or safety doors 16 are provided one each in the side wall of the discharge tubes 13 and 14. If discharge spout 15 becomes jammed to such an extent that the material from either or both of the augers 5 and 6 cannot freely move from the trough 7, the material is packed within the respective tubes 13 and 14. At a selected pressure, the safety relief door 16 associated with the packed material opens at a predetermined pressure and provides an auxiliary discharge for the material. The operating relief door prevents establishment of dangerous stresses on the related discharge auger which could otherwise result in a separation of the auger flighting or the like.

The operation of the illustrated embodiment of the invention may be briefly described as follows. Bin 1 is filled with a material which is to be selectively discharged from the storage bin 1, as desired. To remove material, discharge auger motor 10 and the sweep auger motor 11 are energized to produce an output torque and speed in accordance with the type of material stored within the bin 1. The sweep auger 8 will be indexed about the bin 1 and simultaneously rotated to carry the material to the central portion of the trough 7. Simultaneously the discharge motor 10 rotates augers 5 and 6 to carry the material outwardly through the discharge trough 7 and the tubes 13 and 14 and discharges the material via the discharge spout 15. If for any reason the discharge spout 15 becomes jammed, the safety doors 16 will open to allow the auxiliary discharge and thereby prevent creation of damaging stresses within the discharge augers 5 and 6.

More particularly, in the present invention, the discharge trough 7 is a recess in the upper surface of the base 3 which extends radially of the storage structure from somewhat past the center and outwardly to tubes 13 and 14. The walls of trough 7 are vertical and laterally spaced with the ends joined by an innermost end curved vertical portion 17. A protective trough liner 18 corresponding to the shape of the recess is secured to the bottom and side walls thereof.

The discharge augers 5 and 6 are mounted in laterally spaced relation within trough 7 and longitudinally extend for the complete length thereof with transmission 12 mounted between the innermost ends. A convex hat-shaped dividing member 19 extends through trough 7 from the outer side of transmission 12 and includes a pair of side mounting flanges 20 which rest upon the base of the trough 7 and an integral raised central portion. The mounting flanges 20 are secured to the base by any suitable means, such as the attachment bolts 21. The central portion extends upwardly from flanges 20 with slanted side walls terminating in an upper flat top wall 22 lying immediately below the horizontal plane of base 3. The divider member 19 thus defines a pair of similar discharge auger chambers 23 extending from the center of trough 7 within which the discharge augers 5 and 6 are respectively mounted.

The depth of the trough 7 is such that the augers 5 and 6 are completely below the top surface of base 3 which is provided with a further slight recess 24 adjacent the opposite sides of trough 7. Similar floor plates 25 are similarly secured as by bolts 26 in the recesses 24 and extend inwardly toward each other, terminating in slightly spaced relation to the side edge of the top flat wall 22 of dividing member 19. The inner corners of plates 25 are removed as at 27 to increase the opening at the center of bin 1. This structure than defines a pair of slot or edge openings 28 and 29 to the respective auger discharge chambers 23. The floor plates 25 and recesses 24 are of the same thickness to provide a continuous planar support for the material except for the central open part of trough 7.

The sweep auger 8 and the transmission 12 may be generally constructed in the illustrated embodiment of the invention in accordance with applicant's copending application of which this application is a continuation in part, with the outer end of the sweep auger 8 riding on the floor of bin 1. To span the opening between the floor plates 25, an auger transfer plate 30 is welded or otherwise secured to the top wall 22 of the divider 19 and spans the space between the floor plates 25 and 26.

The dividing member 19 terminates within trough 7 immediately adjacent the transmission unit 12. A closure or baffle plate 31 is welded or otherwise secured to the inner face or edge of the central dividing member to close the central portion thereof including top wall 22 and prevent transfer of material from the bin 1 into a drive shaft chamber 32 defined thereby and restrict discharge of material into the chambers 23 of the discharge augers 5 and 6.

The transmission 12 which may correspond to that of applicant's previously referred to copending application includes a transmission input unit 33 immediately adjacent to the plate 31 with a bearing portion 34 projected inwardly in sealed relation through an opening in plate 31. An input transmission shaft 35 of the input unit 33 is directly coupled to a hollow transmission drive shaft extension 36 which extends outwardly through the chamber 32 defined by the dividing member 19.

As most clearly shown in FIGS. 2 and 3, the shaft extension 36 protrudes outwardly from trough 7 between tubes 13 and 14 and is coupled at its outer end to a transmission shaft 37 by a coupling 38. An end baffle plate 39 is welded or otherwise secured to the outer central end of the dividing member 19 to provide a partial mounting surface for the exterior discharge and drive assembly 9.

An access cover 41 is provided in the top wall 22 of the dividing member 19 adjacent to the connection of the input shaft 35 and the transmission shaft extension 36 for access to a similar coupling 42 and is releasably secured in place by bolts 43.

Generally the transmission unit 12 is thus connected to shaft 37 which is driven by motor 11. Unit 12 may correspond to that of the previously referred to application and is briefly described herein.

Referring particularly to FIGS. 1 and 3, a lower gear box 44 is bolted or otherwise secured to the bottom of the trough 7. A vent tube 45 is connected to the gear box and to the baffle plate 31 to vent the gear box into the drive shaft chamber 32 defined by the dividing member 19. A turret 46 is rotatively mounted on the top of gear box 44 with the sweep auger 8 secured thereto and extending radially outwardly therefrom. The turret 45 is adapted to be driven or rotated about a vertical axis for indexing of the sweep auger 8. The sweep auger 8 is coupled to the input shaft 35 by a gear unit, not shown, within box 44 and turret 46 to be rotated about its own axis in accordance with rotation of shaft 35 to carry the material inwardly toward the center of the trough 7. Additionally, auger 8 is mounted as described in applicant's copending application to create reaction forces tending to turn turret 46 for controlled indexing of auger 8. The reaction forces may advantageously be increased by an arcuate plate 46a which is secured to the outermost end of the auger shaft and protruding radially beyond the circumference of the auger flight. The end of plate 46a thus engages the floor once during each revolution for the length of its periphery and produces a positive lifting force on the auger with an increased reaction.

Although auger 8 and transmission unit 12 have been briefly described as above, any other suitable drive system may be employed; for example, as shown in U.S. Patent No. 3,084,814 to John W. Schaefer.

The discharge augers 5 and 6 are similarly constructed and mounted and the discharge auger 5 will be described in detail with corresponding elements in discharge auger 6 similarly identified by primed numbers.

The auger 5 includes a central hollow shaft 47 having a spiral flight 48 secured thereto. The inner end of shaft 47 is rotatably supported in bearing mounting plate 49 disposed to the back or innermost side of the transmission unit 12. A triangular shaped divider 50 is welded or otherwise secured to the back side of the gear box 44 with the divider apex centrally located to divert the material to opposite sides thereof and therefore into the terminal and innermost ends of the discharge augers 5 and 6. Bearing plate 49 is secured to an intermediate portion thereof and projects laterally to approximately the wall of the trough 7.

A bearing unit 51 is secured to a bearing plate 49 and is journaled within the innermost end of the hollow auger shaft 47.

The discharge auger 5 extends outwardly from the bearing unit 51 through the discharge trough 7 and the aligned extension 13 of the unit 9 such that rotation thereof moves the material from the inner end of the bin 1 outwardly to spout 15. In the illustrated embodiment of the invention, augers 5 and 6 are shown as dual section units having an inner section within the central opening and an outer section beginning at the inner end of floor plate 25. A coupling shaft 52 connects the two sections to form a single unitary assembly. The flight spacing of the inner section is less than the outer section to reduce the chance for material compaction under floor plates.

The outer end of auger 5 is rotatably supported on a drive shaft of a chain and sprocket coupling assembly 53 which forms a part of the discharge and drive assembly 9.

The discharge and drive assembly 9 is secured to a mounting tube 54 having a curved mounting flange 55 conforming to the outer curvature of the wall 2 and bolted or otherwise secured thereto. As most clearly shown in FIG. 2, the tube 54 forms an extension of trough 7 with the liner 18 and dividing member 19 projecting therethrough. A flat mounting flange 56 on the outer edge of tube 54 mates with a mounting flange 47 of assembly 9 and is interconnected thereto by a plurality of nut and bolt units 58. A plate 59 is welded or otherwise secured between the discharge tubes 13 and 14 in alignment with baffle plate 39 and is secured to the latter by nut and bolt units 60, as more clearly shown in FIG. 2.

The discharge tubes 13 and 14 project outwardly in laterally spaced relationship and are interconnected at the outer end by the chain and sprocket assembly 53 which is welded or otherwise secured to the forward end thereof.

Assembly 53 includes a housing 61 having a mounting flange 62 secured to a mating frame 63 joined to tubes 13 and 14 by a plurality of nut and bolt units 64. A coupling pin 65 secured the outer end of the auger shaft 47 to a main driven shaft 66 which is journalled within the gear housing 61, as most clearly shown in FIG. 3. Bearings are respectively secured in the front and rear walls of the housing 61 to support the corresponding end of the driven shaft 66 with a chain sprocket 68 keyed or otherwise fixed to the shaft 66. A drive chain 69 connects the shafts 66 for augers 5 and 6 and an idler roller or chain support 70 is mounted generally centrally between the two sprockets. Drive shaft 66 for auger 5 projects outwardly and is formed with a square end 99 for manual operation with a suitable wrench, not shown.

The shaft 66 for auger 6 projects outwardly into a gear reducer 71. An input shaft 72 of the gear reducer 71 is connected to a split pulley wheel 73 which is connected by a pulley belt 74 to an upper split pulley wheel 75. The upper pulley is secured to the motor shaft 76 of the discharge auger drive motor 10. An adjustable hand wheel stop 77 is provided for adjusting the separation of the upper split pulley wheel 75 thereby adjusting the speed of motor 10 to the augers 5 and 6.

The discharge auger motor 10 is secured to the top of chain and sprocket coupling assembly 53 by a motor mounting structure 78 of any suitable construction to properly locate the output shaft 76.

An opened top and front box-like mounting structure 79 is mounted between the discharge tubes 13 and 14 inwardly of the discharge motor 10, with sweep auger motor 11 adjustably supported thereon. A transmission or gear reducer unit 80 is mounted within structure 79 and includes an output connected by chain and sprockets 81 to the transmission shaft 37, as most clearly shown in FIG. 2. A pulley unit 82 connects the unit 80 to the motor 11 which is mounted on the structure 79, as follows.

Referring particularly to FIGS. 2 and 4, the mounting structure 79 includes a motor platform 83 which is pivotally secured by depending pivot arms and pin 84 along the one edge, shown to the right in FIG. 4 to a top wall of structure 79. A pair of adjustable studs 85 are threaded through the opposite edge portion of the platform 83 and pass downwardly into supporting engagement with the top wall of the box-like mounting structure 79. The output of the motor 11 which is transmitted by the pulley unit 82 to the gear reducer unit 81 and thereby to the transmission shafts 37 and 36 is adjusted by adjusting studs 85 and thereby adjusting the tension in the pulley unit 82.

In operation, the coupling of the sweep auger motor 11 to the sweep auger 8 is adjusted by positioning of the studs 85 to provide the desired power input to auger 8.

The speed of rotation of the discharge augers 5 and 6 is controlled by the positioning of the hand wheel 77 to adjust the speed of the coupling between the discharge auger motor 10 to the assembly 53 and therefore providing a selective variable speed of the discharge augers 5 and 6. In this manner, the continuous feed of material from the bin 1 can be closely regulated in accordance with the material being discharged. Further, if at any time the discharge spout becomes jammed for any reason, the safety or relief doors 16 provide an alternative discharge path while the augers 5 and 6 are in operation.

In the illustrated embodiment of the invention, the doors 16 are similarly constructed and the door 16 in tube 14 is described in detail.

The tube 14 includes an opening 86 in the side wall thereof immediately adjacent to the discharge spout 15. The door 16 is generally a plate-like member having a sealing gasket 87 secured to the inner surface for engagement with the tube wall about the discharge opening 86. This provides an air-tight closure of the opening 86 during normal operation.

The door 16 is mounted by a pair of laterally spaced, L-shaped arms 88 and having the end of one leg welded to the outer surface of door 16 and projecting upwardly therefrom with the opposite leg extending inwardly over the top of the tube 14. A door handle 89 is welded to the ends of the legs secured to the door 16 for manual opening of the door to inspect discharge of material. The inwardly extending portions of the arm 88 are pivotally interconnected as by suitable pivot pins 90 to correspondingly spaced supports or brackets 91 which are secured to the top wall of the tube 14 and extend vertically upwardly therefrom. Brackets 91 include back walls 92 which are normal to the principle plane of arms 88 and which terminate in forwardly bent horizontal tabs 93. Coil springs 94 have one end secured to the inwardly projecting end of the L-shaped arms 88 and the opposite end secured to bent over tabs 93 to continuously and resiliently urge the door 16 about the axis of pivot pins 90 into sealing engagement with the adjacent face of the tube 14. The springs 94 are selected to provide an air-tight seal under all normal operations of the system. However, if for any reason during the actuation of the discharge augers 5 and 6, the discharge spout 15 becomes jammed such that material cannot flow from the respective discharge tubes 13 and/or 14, the stresses will be transferred to the corresponding door 16 against the bias of the springs 94. If the force increases to a dangerous level, such as will adversely affect the related discharge auger or related mechanical structure, the force overcomes the force of the coil springs 94 and pivots the relief door 16 outwardly, as shown in FIG. 4, thereby allowing the material to flow outwardly through the auxiliary or relief opening 86. The assembly 9 can therefore be interconnected to provide a positive drive torque sufficient to move the material from the bin 1 and to readily overcome normal jamming forces and the like, while positively preventing stresses rising to an adverse or damaging level.

The present invention thus provides an improved bottom loading structure which will allow rapid, high speed movement of material from a storage bin in accordance with the character of the material stored. However, damaging forces on the transmission unit and the discharge auger unit are positively prevented by providing a relief at a selected stress level.

In operation, the sweep auger 8 and the discharge augers 5 and 6 are independently driven at selected optimum speeds and torque conditions in accordance with the material stored therein. The internal structure of the unloader, and particularly the dual augers 5 and 6 and the simple structure for forming of discharge channels 23 within the trough 7 provides a very reliable, rugged, and long life construction. The complete free flow opening or slots 28 and 29 into the discharge channels for discharge augers 5 and 6 allow rapid transfer of free flowing materials while the sweep auger 8 will insure complete emptying of the structure of free and semi-free flowing materials.

Referring particularly to FIGS. 7 and 8, an alternative and simplified relief door mounting structure is shown with corresponding elements similarly numbered in both embodiments. In FIGS. 7 and 8, the relief door 16 is pivotally mounted to suitable brackets 95 secured to the top of the discharge tube 14. A small L-shaped angle 96 is secured to the upper end of arms 88 and projects laterally outwardly of tube 14 to dispose one flange 97 extending parallel to tube 14. The spring 94 is secured at one end to the channel flange 97 and at the opposite end to the underside of tube 14 and resiliently urges the door 16 to the closed position.

The structure of FIGS. 7 and 8 generally functions in the same manner as the relief doors in the previous embodiment and no further description thereof is given.

In actual test operations, it has been found that the apparatus constructed in accordance with this provides a very reliable output assembly which can operate under relatively large masses of material within the storage bin, and will handle material with different flow characteristics including free-flowing and semi-flowing materials. The relief doors provided a highly reliable protective action when the discharge spout was closed.

Various modes of carrying out the invention are contemplated as being within the scope of the following claims particularly pointing out and distinctly claiming the subject matter which is regarded as the invention.

I claim:

1. A bottom unloader for a storage structure having in combination,
    a discharge trough recessed in the floor of the structure,
    a pair of discharge means mounted in lateral spaced relation within the trough and extending outwardly therefrom for transfer of material through the trough,
    a sweep means having a transmission unit secured to the innermost end between the innermost ends of the discharge means and extending outwardly over the floor,
    a divider disposed within the trough between the discharge means and extending between the transmission and the wall of the storage structure and having a top wall disposed below the floor level,
    cover plates secured to the floor and to the divider and and overlying the space between the divider and the outer walls of the trough to define a pair of separate discharge passageways within which the discharge means function,
    a sweep drive means mounted exteriorly of the structure and having a drive system extending through the divider into the transmission unit, and
    separate drive means mounted exteriorly of the structure and connected to actuate the discharge means.

2. The bottom unloader for a storage structure of claim 1 having tube means secured to the structure in alignment with the discharge passageways and having an outlet opening exteriorly of the storage structure and having a safety discharge opening exteriorly of the storage structure,
    said discharge means positively moving material through the passageway and tube means, and
    a relief door means resiliently secured overlying the safety discharge opening and providing an alternate discharge for the material upon selected closing of the outlet opening.

3. A bottom unloader for a storage structure having in combination,
    a discharge trough forming a part of the bottom of the structure and extending generally from the center of the structure,
    a pair of discharge augers rotatably mounted in laterally spaced relation within the trough and extending outwardly therefrom, feed means for moving material into the inner end of the trough, a transmission unit mounted within the trough and between the innermost ends of the discharge augers and extending upwardly above the level of the trough, said transmission unit having an upper turret secured to the feed means for movement of the feed means within the structure, a hollow divider disposed within the trough between the discharge augers and extending from the transmission to the wall of the storage structure and having a top wall disposed immediately below the floor level, cover plates secured to the floor and extending inwardly toward the divider and terminating in spaced relation relation to said top wall to define discharge passageways within which the discharge augers function having a small slot opening extending the length of the divider, feed drive means mounted exteriorly of the structure and having a drive shaft system extending through the divider into the transmission unit, wall means sealing the opening to the divider about the drive means, and separate drive means mounted exteriorly of the structure and connected to the outer ends of the discharge augers for actuation thereof.

4. The bottom unloader of claim 3 wherein, said feed means is a sweep auger rotatably mounted for rotation about its own axis and for indexing about a vertical axis at the transmission unit, the outer end of the auger being supported by the floor of the structure, and a plate means secured to the top wall of the divider and spanning the opening between the cover plates to provide essentially a continuous support for the sweep auger.

5. A bottom unloader for a storage structure having in combination, a discharge trough recessed in a floor of the structure and opening at the side wall of the structure, a pair of discharge augers rotatably mounted in laterally spaced relation within the trough and extending outwardly from the innermost end of the trough, discharge tube means secured to the structure at the trough opening and extending outwardly with the discharge auger rotatably disposed therein, a sweep auger unit including a transmission unit mounted between the innermost ends of the discharge augers and having a top turret rotatably driven about a vertical axis and having a sweep auger rotatably mounted to the top turret and extending outwardly over the floor, a divider disposed within the trough between the discharge augers and extending between the transmission and the wall of the storage structure, said divider including a top wall disposed immediately below the floor level and having downwardly and outwardly extended side walls, a sweep auger drive means mounted exteriorly of the structure and having a drive shaft system extending through the divider into the transmission unit, a cover plate welded to the inner end of the divider and closing the divider about the drive shaft system, cover plates secured to the floor and extending toward the top wall of the divider and terminating in spaced relation thereto to define discharge passageways within which the discharge augers function, said floor being recessed to dispose the top surface thereof in the principal plane of the floor, and separate drive means mounted exteriorly of the structure and connected to the outer ends of the discharge augers.

6. In a high speed bottom unloader for a cylindrical bin having a concrete base having a recess extending from the center to the outer wall, said wall having an opening aligned with the recess, a sweep auger disposed within the bin and mounted at its inner end by a transmission unit disposed within the recess and having its outer end resting upon the floor adjacent to the bin wall, a divider disposed centrally of the recess and having a top horizontal wall below the top level of the base and inclined integrally side walls and a closure plate sealing the inner end of the divider with a transmission input shaft unit sealed within an opening therein, said divider extending outwardly from adjacent the transmission to the bin wall, a pair of floor plates secured to the base, one each adjacent the side walls of the recess and extending laterally inwardly to substantially but incompletely span the distance ot the divider top wall and defining discharge passageways for removal of material from the bin, a pair of discharge augers mounted with the trough to the opposite sides of the divider and below the floor plates, said discharge augers extending past the transmission unit and outwardly through the opening in the bin wall, and a drive shaft assembly extending through the raised portion of the divider and connected to the transmission unit at the input shaft unit.

7. The high speed bottom unloader of claim 6 having discharge tubes disposed over the outer ends of the discharge augers and having an outer pair of axially spaced discharge openings, and spring loaded relief doors secured over the innermost of the pair of discharge openings to permit discharge therethrough upon blocking of the outer discharge openings.

8. The high speed bottom unloader of claim 7 having the innermost discharge openings in the outer side of the tubes and including, vertical L-shaped pivot arms having one branch secured to the corresponding relief doors and projecting upwardly therefrom, pivot means secured to the corresponding discharge tube and the pivot arms at the junction of the two branches thereof, anchor brackets projecting upwardly from the corresponding tubes, and coil springs secured to the corresponding anchor brackets and second branches of the pivot arms to resiliently hold the doors closed.

9. The high speed bottom unloader of claim 8 having the innermost discharge openings in the outer side of the tubes and including, vertical L-shaped pivot arms having one branch secured to the corresponding relief doors and projecting upwardly therefrom, pivot means secured to the corresponding discharge tube and the pivot arms at the junction of the two branches thereof, spring arms secured to the pivot arms outwardly of the pivot point and the corresponding discharge tube and extending laterally from the pivot arm, and coil springs secured to the spring arms and the discharge tube to resiliently hold the doors closed.

10. The high speed bottom unloader of claim 6 having a discharge and drive assembly releasably secured to the bin wall to seal the opening therefrom and having discharge tubes projecting outwardly in alignment with the discharge augers, a sweep auger motor mounted upon the drive assembly intermediate the length thereof and coupled to the outer end of the drive shaft assembly, a drive unit secured to the outer ends of the discharge tubes and having interconnected drive shafts connected to the outer ends of the discharge augers, and a discharge auger motor mounted upon the outer end of the discharge and drive assembly and connected to one of said drive shafts.

11. The high speed bottom unloader of claim 10 wherein said sweep auger motor mounting and connection includes, a pivot plate having the sweep auger motor secured thereto and being pivotally mounted along one edge, adjustment means adjustably supporting the plate in spaced relation to the pivotally mounted edge, and a pulley means connecting the motor to the drive shaft assembly and thereby adjusting the input to the drive shaft assembly.

12. In a high speed bottom unloader for a cylindrical bin including a unit base having a discharge trough extending from the center to the outer wall with an open end, a sweep auger disposed within the bin and mounted at its inner end by a transmission unit disposed within the trough and having its outer end resting upon the floor adjacent to the bin wall, a divider having a hat-shaped cross section with a pair of flanges resting upon the floor of the recess and a central raised portion having a horizontal wall below the top level of the base and inclined integrally side walls, said divider extending outwardly from adjacent the transmission to the bin wall, said divider further including a closure plate sealing the end of raised portion and having an input shaft hub sealed within an opening therein, a drive shaft unit extending through the raised portion of the divider and connected to the transmission unit at the input shaft hub, a pair of floor plates secured to the base, one each adjacent the side walls of the recess and extending laterally inwardly to substantially but incompletely span the distance to the divider top wall and defining discharge passageways for removal of material from the bin, the inner ends of the plates being substantially aligned with the inner end of the divider, a sweep auger support plate forming a part of the top wall of the divider adjacent the bin wall to support the outer end of the sweep auger as it moves over the divider, a pair of discharge augers mounted within the trough to the opposite sides of the divider and below the floor plates, said discharge augers extending past the transmission unit and outwardly through the open end of the trough, discharge tube means disposed over the outer ends of the discharge augers and discharge openings at the outer ends, spring loaded relief doors in the discharge tubes inwardly of the discharge openings to permit alternate discharge paths if the discharge openings are blocked, a mounting frame assembly connecting the inner ends of the tubes to each other and releasably secured to the bin wall to seal the trough opening therefrom, a drive unit secured to the outer ends of the discharge tubes and having drive means connected to the outer ends of the discharge augers, a sweep auger motor mounted upon the discharge tubes intermediate the length thereof and coupled to the outer end of the drive shaft unit, and a discharge auger motor mounted upon the outer end of the discharge tubes and connected to the drive means.

13. In a high speed bottom unloader for a cylindrical bin having a concrete base having a recess extending from the center to the outer wall, said wall having an opening aligned with the recess, a sweep auger disposed within the bin and mounted at its inner end by a transmission unit disposed within the recess and having its outer end resting upon the floor adjacent to the bin wall, said transmission unit having an input drive unit below the auger, a divider having a hat-shaped cross section with a pair of flange resting upon the floor of the recess and a central raised portion defining an auger drive shaft chamber having a horizontal top wall below the top level of the base and inclined integral side walls joining the top wall to the flanges, said divider extending outwardly from adjacent the transmission to the bin wall, said divider further including a closure plate sealing the shaft chamber with the input drive unit sealed within an opening therein, a pair of floor plates secured to the base, one each adjacent the side walls of the recess and extending laterally inwardly to substantially but not incompletely span the distance to the divider top wall and defining discharge passageways for removal of material from the bin, the plates being substantially co-extensive with the divider and having the inner opposed corner portions removed, a sweep auger support plate secured to the top wall of the divider adjacent the bin wall to support the outer end of the sweep auger as it moves over the divider, a pair of discharge augers mounted within the trough to the opposite sides of the divider and below the floor plates, said discharge augers extending past the transmission unit and outwardly through the opening in the bin wall, a drive shaft unit extending through the raised portion of the divider and connected to the transmission unit at the input drive unit, a pair of rectangular discharge tubes telescoped over the outer ends of the discharge augers and having bottom wall discharge openings, a mounting frame assembly connecting the inner ends of the tubes to each other and releasably secured to the bin wall to seal the opening therefrom, spring loaded relief doors in the outer side walls of the discharge tubes to permit alternate discharge paths if the discharge openings are blocked, a sweep auger motor mounted upon the discharge tubes intermediate the length thereof and adjustably coupled to the outer end of the drive shaft unit, a chain drive box secured to the outer ends of the discharge tubes and having coupling shafts connected to the outer ends of the discharge augers within the corresponding discharge tubes and rotatably supported by bearing means in the opposite walls of the chain drive both with a chain drive interconnecting the coupling shafts.

a discharge auger motor mounted upon the outer end of the discharge tubes and chain drive box, and a pulley coupling connecting the discharge auger motor to one of said coupling shafts and including manually operable means to adjust the pulley speed and thereby adjust the discharge auger speed.

14. A bottom unloader for a storage structure, passageway means within the storage structure having an inlet opening within the storage structure and an outlet tube secured to the passageway means and extending outwardly therefrom with a discharge opening exteriorly of the storage structure, a discharge auger rotatably mounted within the passageway and the tube to positively move material from the storage structure, said tube having a second discharged opening exteriorly of the storage structure and providing an alternate discharge path for the material, door means resiliently secured overlying the second discharge opening, vertical pivot arms secured to the door means and pivotally attached at the upper end to the outlet tube,
anchor struts secured to the tube and extending upwardly therefrom in alignment with said arms, and
coil springs secured to the upper end of each arm and to the upper end of each strut to resiliently hold the doors closed to prevent discharge of material therefrom unless the first discharge opening is effectively closed.

References Cited by the Examiner

UNITED STATES PATENTS

| | | | |
|---|---|---|---|
| 1,700,405 | 1/1929 | Guidi | 222—318 X |
| 2,827,921 | 3/1958 | Sherman et al. | |
| 2,914,198 | 11/1959 | Hein. | |
| 3,067,914 | 12/1962 | Ellaby. | |

GERALD M. FORLENZA, *Primary Examiner.*

R. G. SHERIDAN, *Examiner.*